United States Patent
Yang et al.

(10) Patent No.: US 9,828,719 B2
(45) Date of Patent: Nov. 28, 2017

(54) LAUNDRY TREATING APPARATUS

(71) Applicant: LG ELECTRONICS INC., Seoul (KR)

(72) Inventors: Jinho Yang, Seoul (KR); Jongsung Lee, Seoul (KR); Hocheol Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 14/689,207

(22) Filed: Apr. 17, 2015

(65) Prior Publication Data

US 2015/0299929 A1    Oct. 22, 2015

(30) Foreign Application Priority Data

Apr. 17, 2014    (KR) .................. 10-2014-0046236

(51) Int. Cl.
| | |
|---|---|
| D06F 39/00 | (2006.01) |
| F21V 8/00 | (2006.01) |
| F21V 33/00 | (2006.01) |
| H01H 19/02 | (2006.01) |
| F21Y 115/10 | (2016.01) |

(52) U.S. Cl.
CPC ........ *D06F 39/005* (2013.01); *F21V 33/0044* (2013.01); *G02B 6/0001* (2013.01); *H01H 19/025* (2013.01); *F21Y 2115/10* (2016.08); *H01H 2219/06* (2013.01); *H01H 2219/0622* (2013.01)

(58) Field of Classification Search
CPC ............... D06F 39/005; H01H 19/025; H01H 2219/0622; H01H 2219/06; G02B 6/0001; F21V 33/0044; F21Y 2115/10
See application file for complete search history.

(56) References Cited

U.S. PATENT DOCUMENTS 9,086,216 B2 *    7/2015    Park .................... F21V 33/0044
2005/0077166 A1    4/2005    Kim
(Continued)

FOREIGN PATENT DOCUMENTS

| CN | 1492098 | 4/2004 |
|---|---|---|
| CN | 201245779 | 5/2007 |
| CN | 201245779 Y | 5/2009 |

(Continued)

OTHER PUBLICATIONS

Office Action issued in Chinese Application No. 201510184409.8 dated Aug. 30, 2016, 11 pages (with English translation).
(Continued)

*Primary Examiner* — David V Bruce
(74) *Attorney, Agent, or Firm* — Fish & Richardson P.C.

(57) ABSTRACT

A laundry treating apparatus is described. The laundry treating apparatus includes a plurality of light emitting diodes (LEDs) mounted on a printed circuit board (PCB). The laundry treating apparatus further includes a light guide that includes an inner wall and an outer wall and ribs located between the inner wall and the outer wall, the ribs defining cells that are configured to accommodate the plurality of LEDs. The laundry treating apparatus further includes a window that is configured to allow light emitted from the plurality of LEDs to pass through. Each rib includes a ridge portion that decreases in thickness toward the window and is pointed toward the window.

15 Claims, 8 Drawing Sheets

(56) References Cited

U.S. PATENT DOCUMENTS

2013/0271950 A1* 10/2013 Park .................... F21V 33/0044
362/23.07
2015/0299932 A1* 10/2015 Park .................... F21V 33/0044
362/23.04

FOREIGN PATENT DOCUMENTS

| CN | 101672442 | 3/2010 |
|----|-----------|--------|
| CN | 103374806 | 10/2013 |
| EP | 2 039 821 A1 | 3/2009 |
| EP | 2 650 422 A1 | 10/2013 |
| JP | 2005-21602 | 1/2005 |
| KR | 10-2006-0120944 A | 11/2006 |

OTHER PUBLICATIONS

European Search Report dated Sep. 1, 2015, for European Application No. 15164125.5, 9 pages.

\* cited by examiner

LAUNDRY TREATING APPARATUS

CROSS-REFERENCE TO RELATED APPLICATION

This application claims the priority benefit of Korean Patent Application No. 10-2014-0046236, filed on Apr. 17, 2014 in the Korean Intellectual Property Office, the disclosure of which is incorporated herein by reference.

FIELD

The present application relates to a laundry treating apparatus, and more particularly to a laundry treating apparatus including a light guide adapted to guide light emitted from LEDs.

BACKGROUND

Laundry treating apparatuses generally refer to apparatuses that are constructed to apply mechanical action generated by electric power to clothing and bedclothes (hereinafter, referred to as "laundry") so as to remove contaminants from the laundry or to supply hot air to the laundry so as to dry the laundry.

The laundry treating apparatus may include a control panel that enables commands for operation of the laundry treating apparatus to be input and that displays various information regarding the laundry treating apparatus.

The control panel may be mounted on an upper portion of the laundry treating apparatus. A user may manipulate at least one manipulation unit provided at the control panel while viewing various information displayed on the control panel, and the laundry treating apparatus may be operated by manipulation through the manipulation unit.

The manipulation unit may be provided with a tap switch that is switched by a button, a rotary switch that is rotated by a rotary knob, and the like.

The laundry treating apparatus may include LEDs, a window through which light emitted from the LEDs passes, and a light guide for guiding the light emitted from the LEDs to the window, thus allowing the light emitted from the LEDs to be represented through the window to the outside.

SUMMARY

According to an innovative aspect of the subject matter described in this application, a laundry treating apparatus includes a plurality of light emitting diodes (LEDs) mounted on a printed circuit board (PCB); a light guide that includes an inner wall and an outer wall and ribs located between the inner wall and the outer wall, the ribs defining cells that are configured to accommodate the plurality of LEDs; and a window that is configured to allow light emitted from the plurality of LEDs to pass through, wherein each rib includes a ridge portion that decreases in thickness toward the window and is pointed toward the window.

The laundry treating apparatus may include one or more of the following optional features. Each rib includes an inclined portion that increases in thickness as a distance from the window increases. Each ridge portion has a triangular cross-section. Ends of the ridge portions are located in a same plane as ends of the inner and outer walls. The window includes an annular light transmission portion on an exterior of the laundry treating apparatus. The ribs are evenly spaced apart. The ribs are configured to reflect the light emitted from the plurality of LEDs outside the window. The inclined portion of each rib is configured to reflect the light emitted from the plurality of LEDs outside the window. A second group of the ribs are configured to reduce a transmission of the light emitted from the plurality of LEDs to an area above each rib of the second group of the ribs.

According to another innovative aspect of the subject matter described in this application, a laundry treating apparatus includes a plurality of light emitting diodes (LEDs) mounted on a printed circuit board (PCB); a light guide that includes an inner wall and an outer wall and ribs located between the inner wall and the outer wall, the ribs defining cells that are configured to accommodate the plurality of LEDs; and a window that is configured to allow light emitted from the plurality of LEDs to pass through, where a first group of the ribs include a ridge portion that decreases in thickness toward the window and is pointed toward the window, and where a second group of the ribs have a constant thickness.

The laundry treating apparatus may include one or more of the following optional features. The first group of the ribs each include an inclined portion that increases in thickness as a distance from the window increases. Each ridge portion has a triangular cross-section. Ends of the ridge portions are located in a same plane as an end of at least one of the inner and outer walls. The plurality of LEDs include one or more LEDs that are configured to radiate light to a course indicating region of the window and one or more LEDs that are configured to radiate light to a region of the window other than the course indicating region.

The first group of the ribs define cells accommodating the one or more LEDs that are configured to radiate light to the course indicating region of the window. The plurality of LEDs are arranged in a circular pattern. The first group of the ribs define cells that are configured to accommodate LEDs that are located at an upper or lower portion of the circular pattern. The window includes an annular light transmission on an exterior of the laundry treating apparatus.

It is an object of the subject matter described in this application to provide a laundry treating apparatus that represents an integral lighting pattern having a continuously connected shape to the outside and that makes the lighting pattern look expensive and elegant.

DETAILED DESCRIPTION

A laundry treating apparatus as described in the present disclosure may be applied to any of a top loading type laundry treating apparatus that includes a laundry port formed at the top of a cabinet that allows laundry to be put into or taken out therethrough, and a front loading type laundry treating apparatus that includes a laundry port formed at a front or side surface of a cabinet. In a subsequent description, a front loading type laundry treating apparatus will be described by way of example.

The laundry treating apparatus should be considered to include all apparatuses for treating laundry. More specifically, the laundry treating apparatus may include a washing machine intended to remove contaminants from laundry using washing water, a dryer intended to remove moisture from laundry so as to dehydrate the laundry, and a combination washer/dryer having both washing and drying functions.

The dryer may include a drum dryer that is constructed to supply hot air into a rotatable drum so as to dry laundry, and a cabinet type dryer (refresher) that is constructed to supply hot air into a drying space accommodating laundry.

Figure 1:
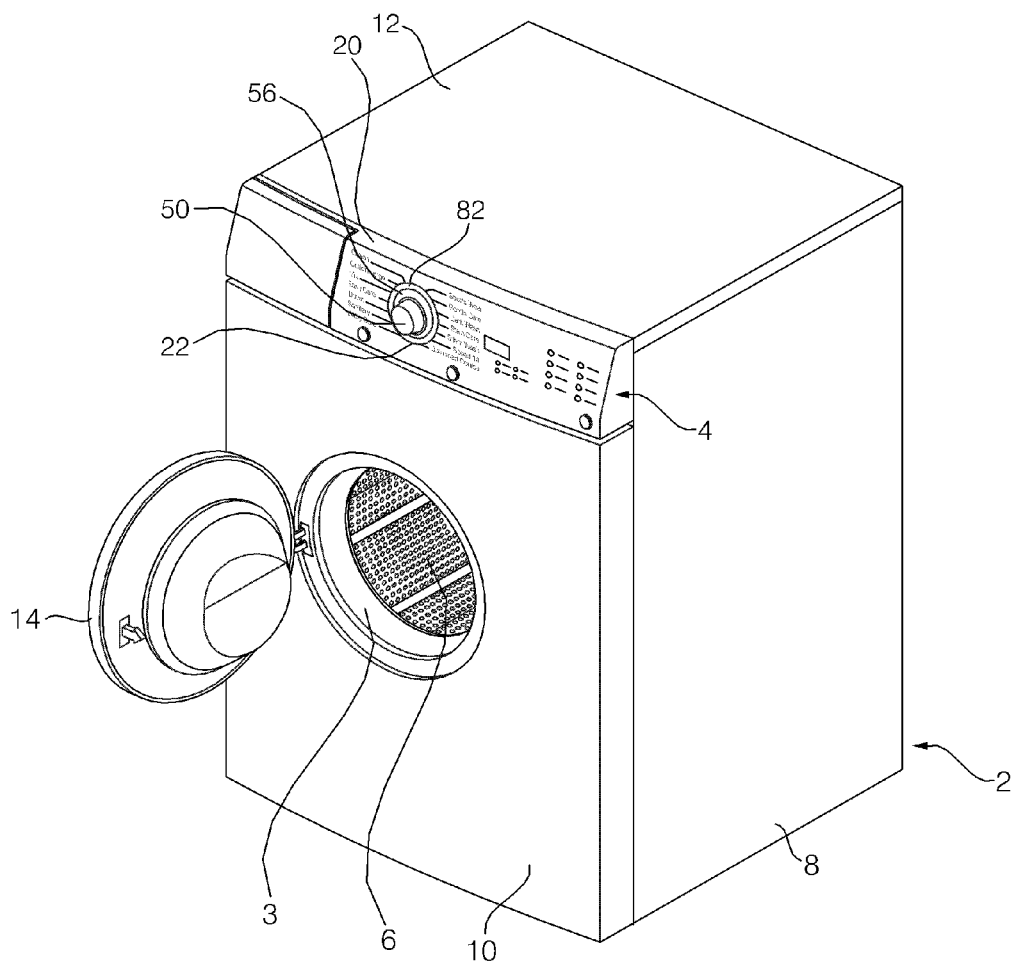
FIG. 1 is a perspective view of an example laundry treating apparatus.

FIG. 1 illustrates an example laundry treating apparatus.

The laundry treating apparatus may include a cabinet 2, and a control panel 4 provided at the cabinet 2.

The cabinet 2 may be a case defining an external appearance of the laundry treating apparatus. The cabinet 2 may be provided with a laundry port 3 through which laundry is put into or taken out of the cabinet 2. The cabinet 2 may be provided therein with a tub for containing washing water. The tub may be provided therein with a drum 6 which is rotatable therein. The cabinet 2 may be provided therein with a motor for rotating the drum 6. If the laundry treating apparatus is a dryer, the tub for containing washing water may not be provided in the cabinet 2, and the drum 6 may be rotatably supported by a support installed in the cabinet 2.

The cabinet 2 may be constructed by bending a single member several times or by coupling a plurality of members to one another. The cabinet 2 may include a base pan, a cabinet body 8 installed on the base pan and having a space for accommodating the tub, a cabinet cover 10 disposed in front of the cabinet body 8 and including the laundry port 3, and a top cover 12 disposed on the cabinet body 8. The cabinet body 8 may be constructed by a single member, and may also be constructed by a plurality of members. The cabinet body 8 may include a left cover disposed on the left side of the base pan, a right cover disposed on the right side of the base pan, and a rear cover disposed on the rear side of the base pan. The cabinet 2 may be constructed by one of various combinations of a plurality of members and may be configured into various modifications.

The cabinet 2 may be provided with a door 14 for opening or closing the laundry port 30. The door 14 may be swingably connected to the cabinet 2 to open or close the laundry port 3, and may also be slidably coupled to the cabinet 2 to open or close the laundry port 3. The door 14 may be hinged to the cabinet 2 by means of a hinge element, and thus may be swung about the hinge element to open or close the laundry port 3.

The control panel 4 may include a manipulation unit. The control panel 4 may include a display unit for displaying information of the laundry treating apparatus. The control panel 4 may include both the manipulation unit and the display unit. The control panel 4 may be disposed on the cabinet cover 10. The control panel 4 may be disposed on a front surface of the cabinet 2, and may define a portion of the external appearance of the laundry treating apparatus.

The control panel 4 may include a control panel body 20. The control panel body 20 may define an external appearance of the control panel 4. The control panel body 20 may be disposed on the cabinet cover 10. The control panel body 20 may provided with the manipulation unit for enabling user manipulation and the display unit for displaying various information of the laundry treating apparatus.

The control panel 4 may include a rotary knob 50 adapted to be gripped by user's fingers to allow user manipulation. The rotary knob 50 may be provided so as to select one of various treatment courses of the laundry treating apparatus. Therefore, a user may select one of the various treatment courses by gripping and rotating the rotary knob 50. The control panel body 20 may be formed with an opening 22 having a larger diameter than that of the rotary knob 50.

The control panel 4 may include a knob decorative member 56 disposed around the rotary knob 50. The knob decorative member 56 may be disposed between the circumference of the rotary knob 50 and the circumference of the opening 22. The knob decorative member 56 may make an appearance around the rotary knob 50 look expensive and elegant.

The control panel 4 may further include a window 82. The laundry treating apparatus may radiate light to the window 82. The light radiated to the window 82 may pass through the window 82, and, as such, a user may recognize various information of the laundry treating apparatus by viewing a shape or a position of the light having passed through the window 82.

Figure 2:
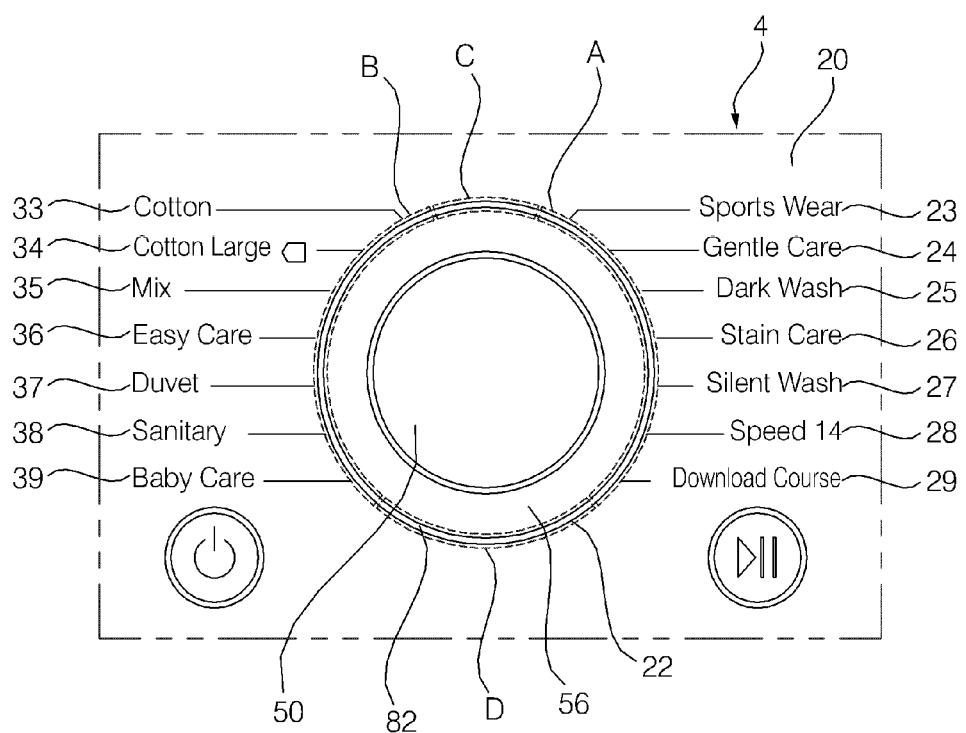
FIG. 2 is an enlarged front view of a part of an example control panel of the laundry treating apparatus.
Figure 3:
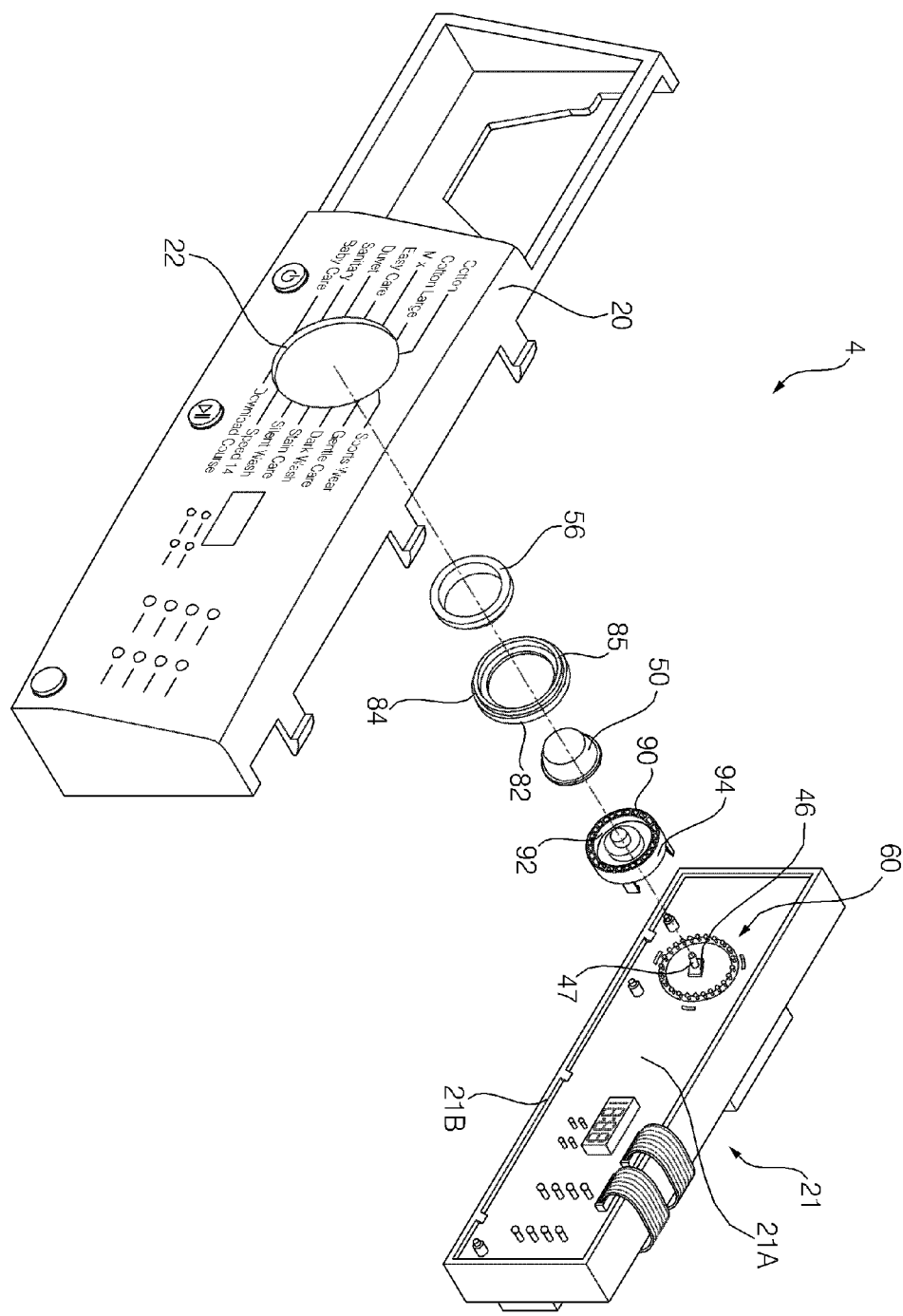
FIG. 3 is an exploded perspective view of the example control panel of the laundry treating apparatus.
Figure 4:
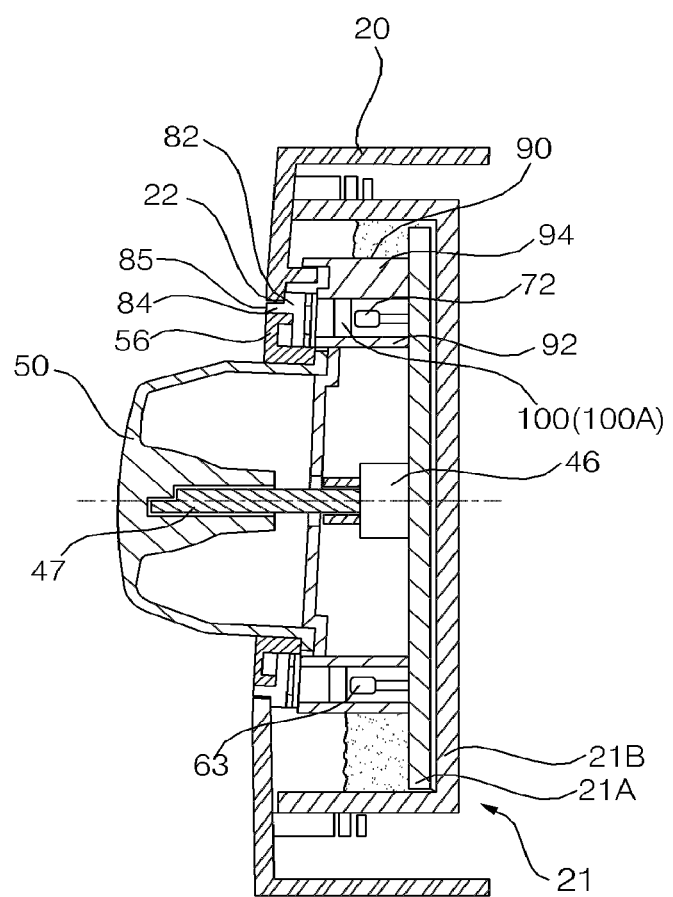
FIG. 4 is a longitudinal sectional view of a part of the example control panel of the laundry treating apparatus.
Figure 5:
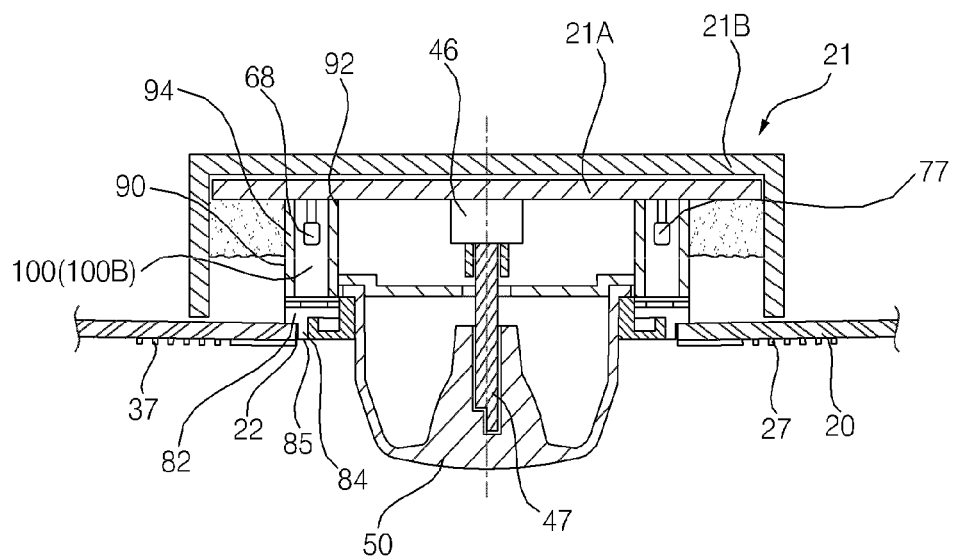
FIG. 5 is a transverse sectional view of a part of the example control panel of the laundry treating apparatus.
Figure 6:
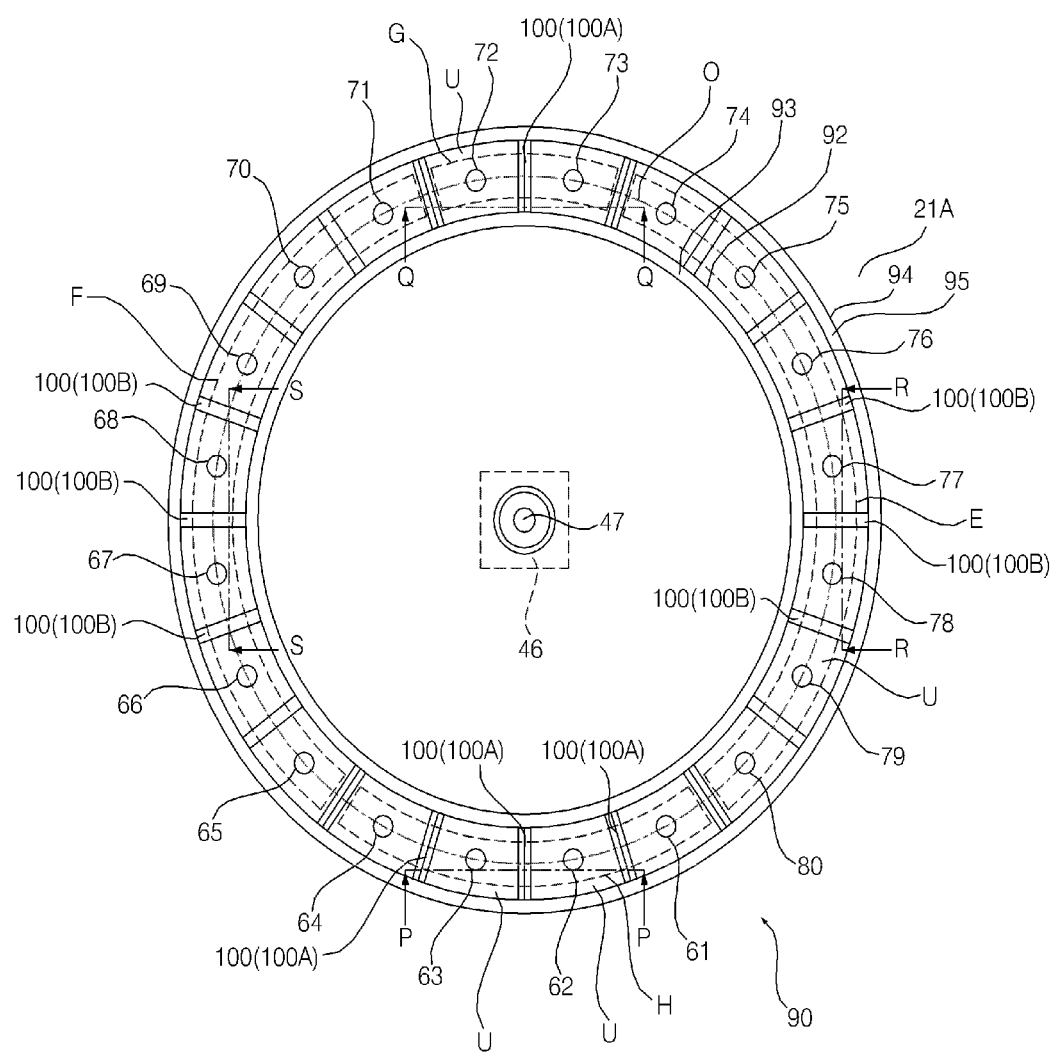
FIG. 6 is an enlarged front view of a plurality of LEDs and a light guide of the laundry treating apparatus.

FIG. 2 illustrates part of an example control panel of a laundry treating apparatus. FIGS. 3-5 illustrate an example control panel. FIG. 6 illustrates examples of a plurality of LEDs and a light guide of a laundry treating apparatus.

The control panel body 20 may include one or more indicators 23-29 and 33-39 for displaying treatment courses that may be selected by the rotary knob 50.

The indicators 23-29 and 33-39 constitute a course display unit that represents various courses (washing programs) of the laundry treating apparatus as numerals, symbols, characters and the like. Each of the indicators 23-29 and 33-39 may be constituted by embossed or engraved lettering formed on the control panel body 20 or a coating applied to the control panel body 20. In addition, the indicators 23-29 and 33-39 may be provided on the control panel body through various technologies other than printing and coating. The plurality of indicators 23-29 and 33-39 may be disposed around the rotary knob 50. A user may recognize a treatment course of the laundry treating apparatus by observing the indicators 23-29 and 33-39, and may select a desired course among the plurality of treatment courses by rotating the rotary knob 50.

The laundry treating apparatus may radiate light to an area near one of the plurality of indicators 23-29 and 33-39, and, as such, a user may recognize the indicator closest to the area to which the light is radiated. Each of the plurality of indicators 23-29 and 33-39 may include characters representing the corresponding course. Each of the plurality of indicators 23-29 and 33-39 may further include a line between the opening 22 and the characters.

The indicators 23-29 and 33-39 may include left indicators 23-29 positioned at the left side of the opening 22, and right indicators 33-39 positioned at the right side of the opening 22.

The plurality of left indicators 23-29 may be positioned together at the left side of the opening 22, and may be spaced apart from one another in the vertical direction.

The plurality of right indicators 33-39 may be positioned together at the right side of the opening 22, and may be spaced apart from one another in the vertical direction.

The control panel 4 may further include a printed circuit board (PCB) assembly 21 installed in the control panel body 20.

The PCB assembly 21 may further include a PCB 21A, and a PCB mount 21B at which the PCB 21A is installed. The PCB mount 21B may be mounted on the control panel body 20 by means of a fastening element such as a screw. The PCB assembly 21 may include a rotary switch 46. The rotary switch 46 may include a rotating central shaft 47 to which the rotary knob 50 is joined. Upon rotation of the rotating central shaft 47, the rotating central shaft 47 may rotate with the rotary knob 50. The rotary switch 46 may include a rotary encoder in which a plurality of switching circuits are provided. The rotary switch 46 may detect rotation of the rotating central shaft 47. The PCB assembly 21 may further include a switch such as a tap switch and a touch switch. The control panel 4 may include a display component for displaying information of the laundry treating apparatus.

The rotary knob 50, which serves as a handle capable of being manipulated by a user, may be connected to the rotary switch 46. When the rotary knob 50 is rotated by a user, the rotary switch 46 may detect a rotating angle of the rotating central shaft 47 rotating with the rotary knob 50, and the laundry treating apparatus may execute the course selected by rotation of the rotary knob 50.

The knob decorative member 56 may be coupled to the window 82. The knob decorative member 56 may be exposed at a front surface thereof to the outside. The front surface of the knob decorative member 56 may be disposed around the rotary knob 50 to improve the aesthetics of the rotary knob 50.

The laundry treating apparatus include a plurality of LEDs 60, the window 82, and a light guide 90.

The plurality of LEDs 60 may constitute a part of the PCB assembly 21. The plurality of LEDs 60 may be mounted on the PCB 21A. The plurality of LEDs 60 may be arranged in a circular shape. The plurality of LEDs 60 may be disposed around the rotary switch 46 of the PCB 21A. The plurality of LEDs 60 may be sequentially disposed along a virtual circle O around the rotary switch 46. The plurality of LEDs 60 may be disposed to surround the rotary switch 46. The plurality of LEDs 60 may be spaced apart from one another along the virtual circle O. The plurality of LEDs 60 may be positioned spaced apart from one another along the virtual circle O at substantially regular intervals. The plurality of LEDs 60 may be spaced apart from one another along the virtual circle O in a clockwise or counterclockwise direction.

The plurality of LEDs 60 may constitute a first lighting pattern having a small rectangular or circular shape, a second lighting pattern having an arcuate shape, or a third lighting pattern having an annular shape, depending on the number of lighting LEDs.

The plurality of LEDs 60 may include one or more first LEDs 65-71 and 74-80, and one or more second LEDs 61-64, 72, and 73.

One or more first LEDs 65-71 and 74-80 may be course LEDs that light up while the laundry treating apparatus displays a treatment course. The one or more second LEDs 61-64, 72, and 73 may be non-course LEDs that do not light up while the laundry treating apparatus displays a treatment course.

The one or more first LEDs 65-71 and 74-80 may be disposed so as to radiate light to course indicating regions A and B of the window 82. The one or more second LEDs 61-64, 72, and 73 may be disposed so as to radiate light to the other regions C and D of the window 82. Hereinafter, the other regions C and D are referred to as non-indicating regions C and D.

The indicating regions A and B may be partial regions of the window 82 that face the partial regions of the control panel body 20 around the opening 22 at which the indicators 23-29 and 33-39 are positioned.

The non-indicating regions C and D may be the other regions of the window 82 that face the partial regions of the control panel body 20 around the opening 22 at which the indicators 23-29 and 33-39 are not positioned.

When the left indicators 23-29 are positioned at the left side around the opening 22, a region of the window 82 spanning from a region adjacent to the uppermost indicator 23 of the left indicators 23-29 to a region adjacent to the lowermost indicator 29 of the left indicators 23-29 may be referred to as a left indicating region A.

When the right indicators 33-39 are positioned at the right side around the opening 22, a region of the window 82 spanning from a region adjacent to the uppermost indicator 33 of the right indicators 33-39 to a region adjacent to the lowermost indicator 39 of the right indicators 33-39 may be referred to as a right indicating region B.

A region of the window 82 spanning from the upper end of the left indicating region A to the upper end of the right indicating region B may be referred to as an upper indication region C, and a region of the window 82 spanning from the lower end of the left indicating region A to the lower end of the right indicating region B may be referred to as a lower indicating region D.

Similarly to the indicators 23-29 and 33-39, the one or more first LEDs 65-71 and 74-80 may also include a plurality of first LEDs. The number of the first LEDs 65-71 and 74-80 may be the same as that of the indicators 23-29 and 33-39. Each of the first LEDs 65-71 and 74-80 may be assigned one indicator. Upon input of a power supply command, the first LEDs 65-71 and 74-80 may be turned on or off in accordance with preset control. Upon input of a power supply command, the first LEDs 65-71 and 74-80 may be turned on or off so as to create a lighting pattern representing power input. Plural LEDs among the first LEDs 65-71 and 74-80 may be selectively turned on during a period for which the laundry treating apparatus displays a treatment course.

The plurality of first LEDs 65-71 and 74-80 may be composed of a first left LED group E including at least one LED positioned to radiate light to the left indicating region A, and a first right LED group F including at least one LED positioned to radiate light to the right indicating region B.

In some implementations, the number of the second LEDs 61-64, 72, and 73 provided at the PCB 21A may be one or more, or two or more. The number of the second LEDs 61-64, 72, and 73 may be less than the number of the indicators 23-29 and 33-39.

Upon input of a power supply command, the second LEDs 61-64, 72, and 73 may be turned on or off in accordance with preset control. Upon input of a power supply command, the second LEDs 61-64, 72, and 73 may be turned on or off so as to create a lighting pattern representing power input.

Plural LEDs among the first LEDs 65-71 and 74-80 may be selectively turned on during a period for which the laundry treating apparatus displays a treatment course.

The second LEDs 61-64, 72, and 73 may be composed of a second upper LED group G including at least one LED that is positioned to radiate light to the upper non-indicating region C, and a second lower LED group H including at least one LED that is positioned to radiate light to the lower non-indicating region D.

When only one of the plurality of LEDs 60 is turned on and the other LEDs are turned off, a small spot lighting pattern having a rectangular or circular shape may be created at a predetermined position of a light transmission portion 84.

When at least one of the plurality of LEDs 60 is turned off and the other LEDs are turned on, an arcuate lighting pattern may be created in a partial area of the light transmission portion 84.

When all of the plurality of LEDs 60 are turned on, an annular lighting pattern may be created throughout the light transmission portion 84.

The plurality of LEDs 60 may be controlled in such a manner as to create the spot lighting pattern and then the arcuate lighting pattern. The plurality of LEDs 60 may be controlled in such a manner that the arcuate lighting pattern is rotated along the light transmission portion 84 clockwise or counterclockwise. The plurality of LEDs 60 may be controlled in such a manner as to create the arcuate lighting pattern and then the annular lighting pattern. The plurality of LEDs 60 may be controlled in such a manner that the arcuate lighting pattern is gradually decreased in size and then is changed into the spot lighting pattern. The plurality of LEDs 60 may create a wider variety of lighting patterns by combination of the spot lighting pattern, the arcuate lighting pattern and the annular lighting pattern. By controlling the plurality of LEDs 60, the laundry treating apparatus may further display various information such as a power supply command in addition to display of the treatment course.

Light emitted from the LEDs may pass through the window 82. The window 82 may have the annular light transmission portion 84 exposed to the outside. The light transmission portion 85 may be exposed at a front surface thereof to the outside of the laundry treating apparatus. The front surface of the light transmission portion 85 may have an annular shape.

The light guide 90 may include a rib 100 disposed between an inner wall 92 and an outer wall 94 to define a cell accommodating the LEDs. The inner wall 92 may be constituted by a smaller cylinder having a smaller diameter than the virtual circle O, and the outer wall 94 may be constituted by a larger cylinder having a larger diameter than the virtual circle O. The light guide 90 may have an annular space defined between the inner wall 92 and the outer wall 94. The plurality of LEDs may be sequentially disposed in the annular space of the light guide 90.

The rib 100 may include a plurality of ribs 100 disposed between the inner wall 92 and the outer wall 94. The rib 100 may be connected at one end thereof to the inner wall 92 and connected at the other end thereof to the outer wall 94. The rib 100 may extend from an outer surface of the inner wall 92 to an inner surface of the outer wall 94. The rib 100 may extend across the annular space. The plurality of ribs 100 may be radially arranged between the inner wall 92 and the outer wall 94 about the rotating central shaft 47. The number of ribs 100 may be larger than that of the LEDs 60 by one. Each of the LEDs may be positioned between a pair of ribs.

The light guide 90 may be constructed such that a pair of adjacent ribs 100, the outer surface of the inner wall 92 and the inner surface of the outer wall 94 define one cell U. Each of the plurality of LEDs 60 may be accommodated in one cell U.

The light guide 90 may be constructed such that the plurality of cells U are sequentially formed along the light guide 90 in a circumferential direction. The window 82 may be disposed to cover all front surfaces of the plurality of cells U.

FIGS. 7-10 illustrate cross-sections of an example light guide and plurality of LEDs.

The plurality of ribs 100 may be configured to have the same structure. The plurality of ribs 100 may be configured such that some ribs 100A of the plurality of ribs 100 have a structure different from that of the other ribs 100B of the plurality of ribs 100.

Each rib 100 may have a thickness that is decreased toward the window 82, thus creating a ridge portion 100 pointed toward the window 82.

The ridge portion 110 may have a triangular section. Light emitted from the LED may be partially guided to the window 82 by the ridge portion 110. An edge of the ridge portion 110 may be positioned on the same plane as an end 93 of the inner wall 92 and an end 94 of the outer wall 94. As a result, since light emitted from the LED is blocked by the ridge portion 110, it is possible to prevent the light from spreading over an excessively large area. In addition, the laundry treating apparatus may show a specific lighting pattern at a predetermined position on the window 82, and it is possible to minimize a possibility that a user falsely recognizes a position of an intended lighting pattern.

The rib 100 may have an inclined portion 114 that is increased in thickness in the opposite direction of the window 82.

The inclined portion 114 may be configured to protrude toward the center of the cell U. The inclined portion 114 may have sloping surfaces that are inclined at a predetermined angle. Light emitted from the LED may be partially directed toward the inclined portion 114. The light directed to the inclined portion 114 may be reflected at the inclined portion 114 and thus may be intensively directed to the window 82, thus maximizing an amount of light directed to the window 82.

Instead of the inclined portion 114, the rib 100 may also have a curved protruding portion that also protrudes toward the center of the cell U but has concave surfaces. The protruding portion may adopt any structure without limitation so long as the protruding portion is capable of intensively reflecting light toward the window 82.

Every one of the ribs 100 formed at the light guide 90 may have the ridge portion 110. Furthermore, every one of the ribs 100 formed at the light guide 90 may have the inclined portion 114.

Meanwhile, the plurality of ribs 100 formed at the light guide 90 may have different structures depending on a size or a function of an intended lighting pattern presented by the plurality of LEDs 60.

Figure 7:
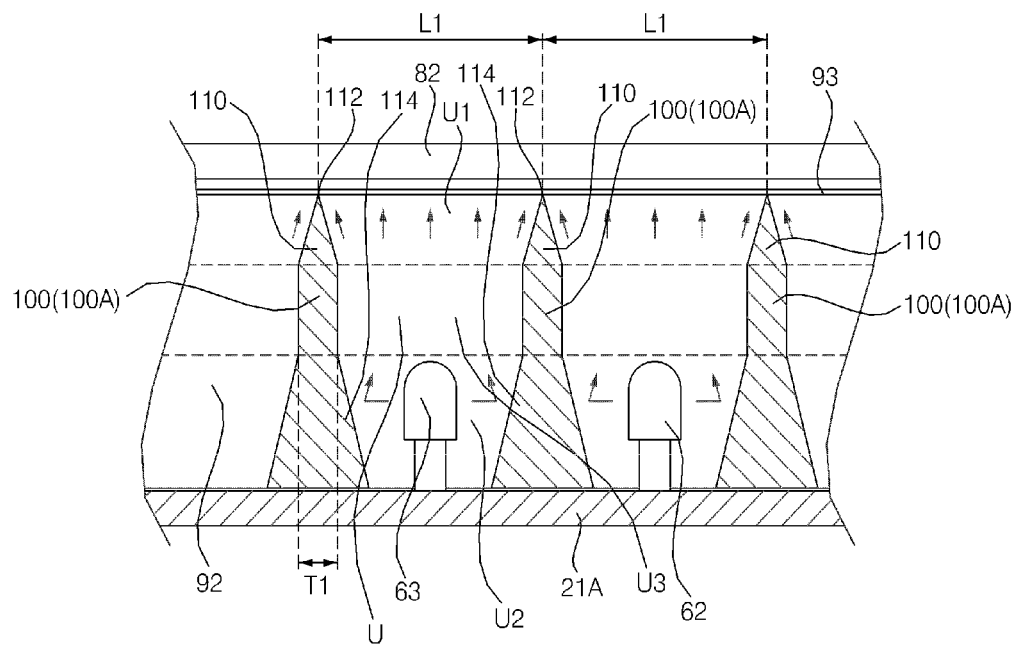
FIG. 7 is a cross-sectional view taken along line P-P of FIG. 6.
Figure 8:
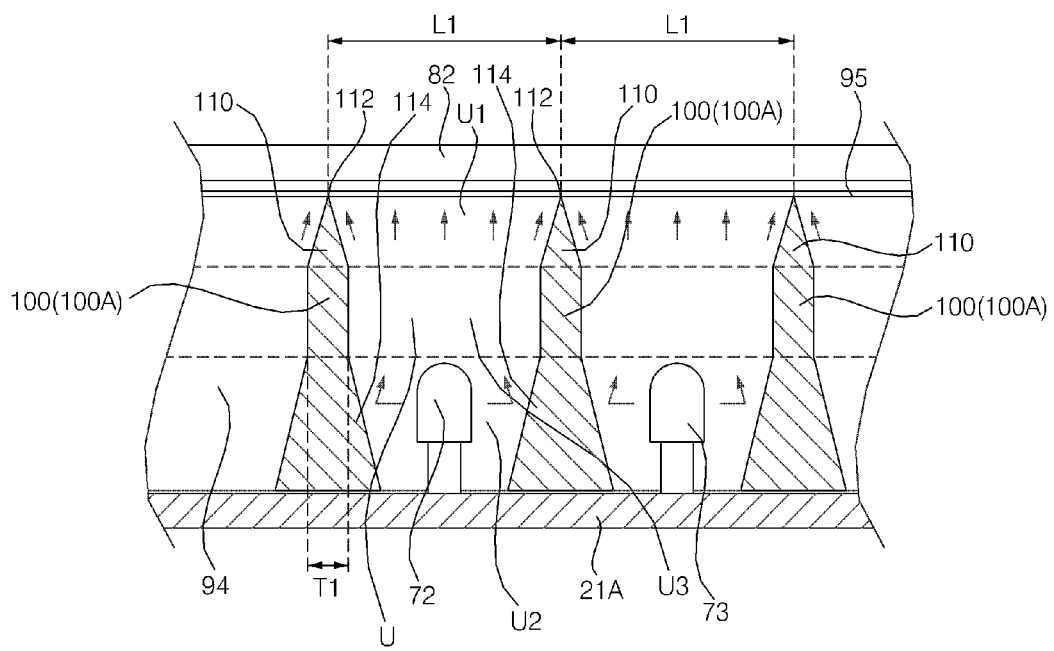
FIG. 8 is a cross-sectional view taken along line Q-Q of FIG. 6.

As illustrated in FIGS. 7 and 8, each of some ribs 100A of the plurality of ribs 100 may include the ridge portion 110 having a thickness that is decreased toward the window 82 and being pointed toward the window 82. The rib 100A including the ridge portion 110 may have the inclined portion 114 having a thickness that is increased in the opposite direction of the window 82.

The ribs 100A including the ridge portions 110 may be ribs that define cells for accommodating the second LEDs 61-64, 72 and 73 among the plurality of LEDs 60.

The ribs 100A including the ridge portions 110 may be ribs that define cells for accommodating the upper LEDs 72 and 73 among the plurality of LEDs 60. Furthermore, the ribs 100A including the ridge portions 110 may be ribs that define cells for accommodating the lower LEDs 61-64 among the plurality of LEDs 60.

The upper LEDs 72 and 73 may be LEDs disposed to radiate light to the upper non-indicating region C of the window 82, and the lower LEDs 61-64 may constitute the second lower LED group H including at least one LED disposed to radiate light to the lower non-indicating region D.

The plurality of LEDs 60 are controlled to create the second arcuate lighting pattern or the third annular lighting pattern. The second arcuate lighting pattern or the third annular lighting pattern may have a continuously connected pattern shape as viewed from the outside. The ridge portions 110 provided at the ribs 100A may assist in causing the second arcuate lighting pattern or the third annular lighting pattern look completely connected along the length.

The section of the cell U defined by the ridge portions 110 of the ribs 100A may constitute a widening space U1 that is continuously widened toward the window 82. The widened space U1 may be disposed to be closer to the window 82 than the PCB 21A. The section of the cell U defined by the inclined portions 114 of the ribs 100A may constitute a narrowing space U2 that is continuously narrowed in the opposite direction of the window 82. The narrowing space U2 may be disposed to be closer to the PCB 21A than the window 82. The section of the rib 100A between the ridge portion 110 and the inclined portion 114 has a constant thickness T1, thus constituting a constant space U3.

The cell U defined by the ribs 100 including the ridge portions 110 may be configured such that the widening space U1 is directly connected to the narrowing space U2 without the constant space U3 or the widening space U1 is directly connected to the constant space U3 without the narrowing space U2. In some implementations, the constant space U3 may be disposed between the widening space U1 and the narrowing space U2.

As illustrated in FIGS. 7 and 8, the rib 100A including the ridge portion 110 may guide light emitted from the LED to a first section L1 of the window 82. The ridge portion 110 may guide light emitted from the LED to as a wide range of the window 82 as possible, and thus may enable light emitted from the two adjacent LEDs to show an continuously connected shape as viewed from the outside.

Figure 9:
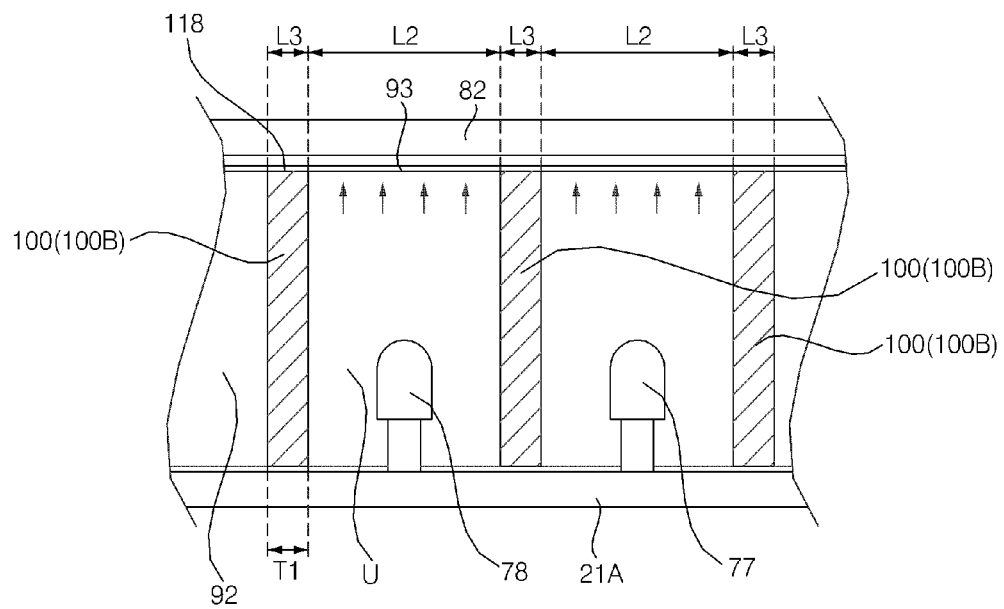
FIG. 9 is a cross-sectional view taken along line R-R of FIG. 6.
Figure 10:
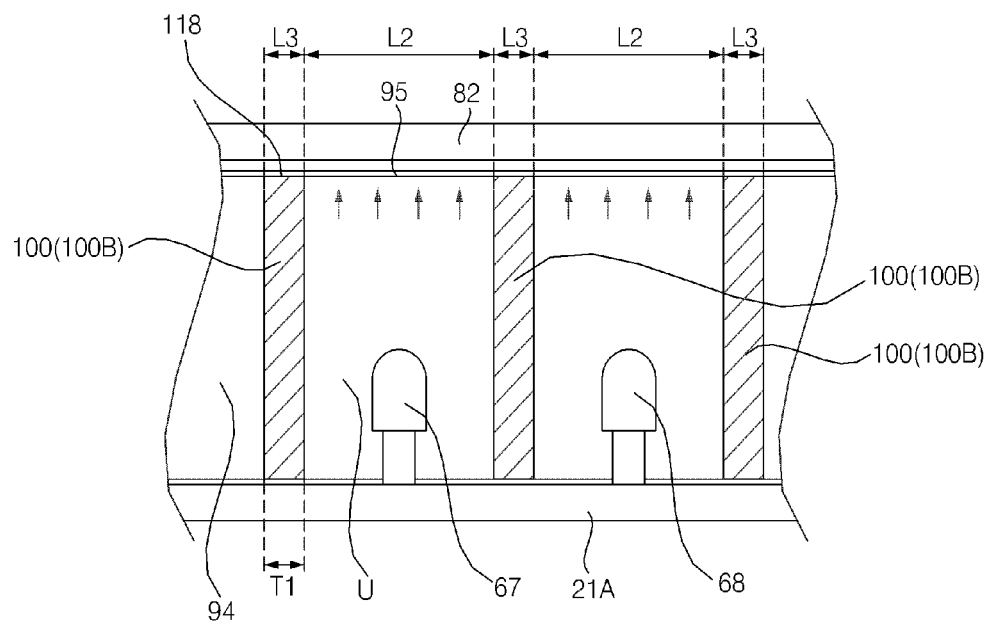
FIG. 10 is a cross-sectional view taken along line S-S of FIG. 6.

As illustrated in FIGS. 9 and 10, among the plurality of ribs 100, each of the other ribs 100B excluding the ribs 100A may have a constant thickness T1 toward the window 82. The rib 100B, which does not include the ridge portion 110, causes the cell U to have a constant cross-sectional area.

As illustrated in FIGS. 9 and 10, the rib 100B that does not include the ridge portion 110 may guide light emitted from the LED to a second section L2 of the window 82. The second section L2 may be smaller than the first section L1. The rib 100B that does not include the ridge portion 110 may have an end 118 having a thickness T1 that is larger than a thickness of an end 112 of the ridge portion 110. Accordingly, it is possible to minimize radiation of light to the section L3 of the window 82 facing the end 118 of the rib 100B that does not include the ridge portion 110. In other words, the window 82 may have the third section L3 which faces the end 118 of the rib 100B that does not include the ridge portion 110 and to which light emitted from the LED is not directly radiated. The third section L3 may be disposed adjacent to the second section L2.

The rib 100B that does not include the ridge portion 100 may prevent light emitted from the LED from spreading into the third section L3. A lighting pattern created by light guided by the rib 100B that does not include the ridge portion 100 may represent an intended shape at a predetermined position, thus minimizing a possibility that a user falsely recognizes a position of an intended lighting pattern.

The laundry treating apparatus may display lighting patterns representing treatment courses and the other lighting patterns representing functions other than the treatment courses.

The lighting pattern representing a function may be an arcuate lighting pattern or an annular lighting pattern. Hereinafter, the laundry treating apparatus is described as being operated in such a manner that, when a power supply command is input to the laundry treating apparatus, an arcuate lighting pattern rotates around the rotary knob or an annular lighting pattern is created around the rotary knob.

Meanwhile, the lighting pattern representing a treatment course may be a small rectangular or circular spot lighting pattern.

The power supply command may be input to the laundry treating apparatus by manipulating a power key provided at the control panel 4. The plurality of LEDs 60 may be controlled to create the arcuate lighting pattern or an annular lighting pattern.

Upon input of a power supply command, the plurality of LEDs 60 may be controlled in such a manner that a predetermined number of LEDs that are arranged clockwise or counterclockwise are turned on to create an arcuate lighting pattern on the window 82 and the arcuate lighting pattern rotates around the rotary knob 50.

Upon input of a power supply command, the plurality of LEDs 60 may be controlled to create an annular lighting pattern on the window 82 by lighting up all of the plurality of LEDs 60.

The ribs 100 of the light guide 90 may guide light emitted from the LEDs to the window 82. At this time, as illustrated in FIGS. 7 and 8, the ridge portions 110 formed at the some ribs 100A of the ribs 100 may guide light emitted from the LEDs to the first sections L1 of the window 82 that is relatively wide. The arcuate lighting pattern rotating around the rotary knob 50 or the annular lighting pattern created around the rotary knob 50 may appear continuously connected. The lighting pattern may look neat and elegant as viewed from the outside.

Upon selection of a treatment course by a user, the laundry treating apparatus may create a small lighting pattern that may be changed in position during rotation of the rotary knob 50. When the rotary knob 50 is gripped and rotated by a user, a single LED may be turned on whereas all the other LEDs may be turned off. Upon selection of a treatment course, the plurality of first LEDs 65-71 and 74-80 may be selectively turned on. Upon selection of a treatment course, one of the plurality of first LEDs 65-71 and 74-80 may be turned on whereas the other LEDs may be turned off.

As illustrated in FIGS. 9 and 10, upon selection of a treatment course, the ribs 100B that do not include the ridge portions 110 may guide light. In other words, the light guided to the ribs 100B that do not include the ridge portions 110 may be intensively radiated to the second sections L2 of the window 82, thus preventing the light radiated to the second sections L2 from spreading into the neighboring second sections L3. As a result, the window 82 may create a clear lighting pattern at a predetermined position corresponding to the lighting LEDs. Therefore, when a user views the window 82 from the outside, it is possible to minimize a possibility that the user falsely recognizes a position of a lighting pattern.

What is claimed is:

1. A laundry treating apparatus comprising:
   a plurality of light emitting diodes (LEDs) mounted on a printed circuit board (PCB);
   a light guide that includes an inner wall and an outer wall and ribs located between the inner wall and the outer wall, the ribs defining cells that are configured to accommodate the plurality of LEDs; and
   a window that is configured to allow light emitted from the plurality of LEDs to pass through,
   wherein each rib in a first portion of the ribs includes a ridge portion that decreases in thickness toward the window and is pointed toward the window, and
   wherein each rib in a second portion of the ribs is configured to reduce a transmission of the light emitted from the plurality of LEDs to an area above the rib in the second portion of the ribs.

2. The laundry treating apparatus according to claim 1, wherein each rib includes an inclined portion that increases in thickness as a distance from the window increases.

3. The laundry treating apparatus according to claim 1, wherein each ridge portion has a triangular cross-section.

4. The laundry treating apparatus according to claim 1, wherein ends of the ridge portions are located in a same plane as ends of the inner and outer walls.

5. The laundry treating apparatus according to claim 1, wherein the window includes an annular light transmission portion on an exterior of the laundry treating apparatus.

6. The laundry treating apparatus according to claim 1, wherein the ribs are evenly spaced apart.

7. The laundry treating apparatus according to claim 1, wherein the ribs are configured to reflect the light emitted from the plurality of LEDs outside the window.

8. The laundry treating apparatus according to claim 1, wherein the inclined portion of each rib is configured to reflect the light emitted from the plurality of LEDs outside the window.

9. A laundry treating apparatus comprising:
   a plurality of light emitting diodes (LEDs) mounted on a printed circuit board (PCB);
   a light guide that includes an inner wall and an outer wall and ribs located between the inner wall and the outer wall, the ribs defining cells that are configured to accommodate the plurality of LEDs; and
   a window that is configured to allow light emitted from the plurality of LEDs to pass through,
   wherein a first group of the ribs include a ridge portion that decreases in thickness toward the window and is pointed toward the window, and
   wherein a second group of the ribs have a constant thickness.

10. The laundry treating apparatus according to claim 9, wherein the first group of the ribs each include an inclined portion that increases in thickness as a distance from the window increases.

11. The laundry treating apparatus according to claim 9, wherein each ridge portion has a triangular cross-section.

12. The laundry treating apparatus according to claim 9, wherein ends of the ridge portions are located in a same plane as an end of at least one of the inner and outer walls.

13. The laundry treating apparatus according to claim 9, wherein:
   the plurality of LEDs include one or more LEDs that are configured to radiate light to a course indicating region of the window and one or more LEDs that are configured to radiate light to a region of the window other than the course indicating region, and
   the first group of the ribs define cells accommodating the one or more LEDs that are configured to radiate light to the course indicating region of the window.

14. The laundry treating apparatus according to claim 9, wherein:
   the plurality of LEDs are arranged in a circular pattern, and
   the first group of the ribs define cells that are configured to accommodate LEDs that are located at an upper or lower portion of the circular pattern.

15. The laundry treating apparatus according to claim 9, wherein the window includes an annular light transmission on an exterior of the laundry treating apparatus.

* * * * *